(No Model.) 2 Sheets—Sheet 1.
C. E. McDANIEL.
FARM GATE.
No. 579,931. Patented Mar. 30, 1897.
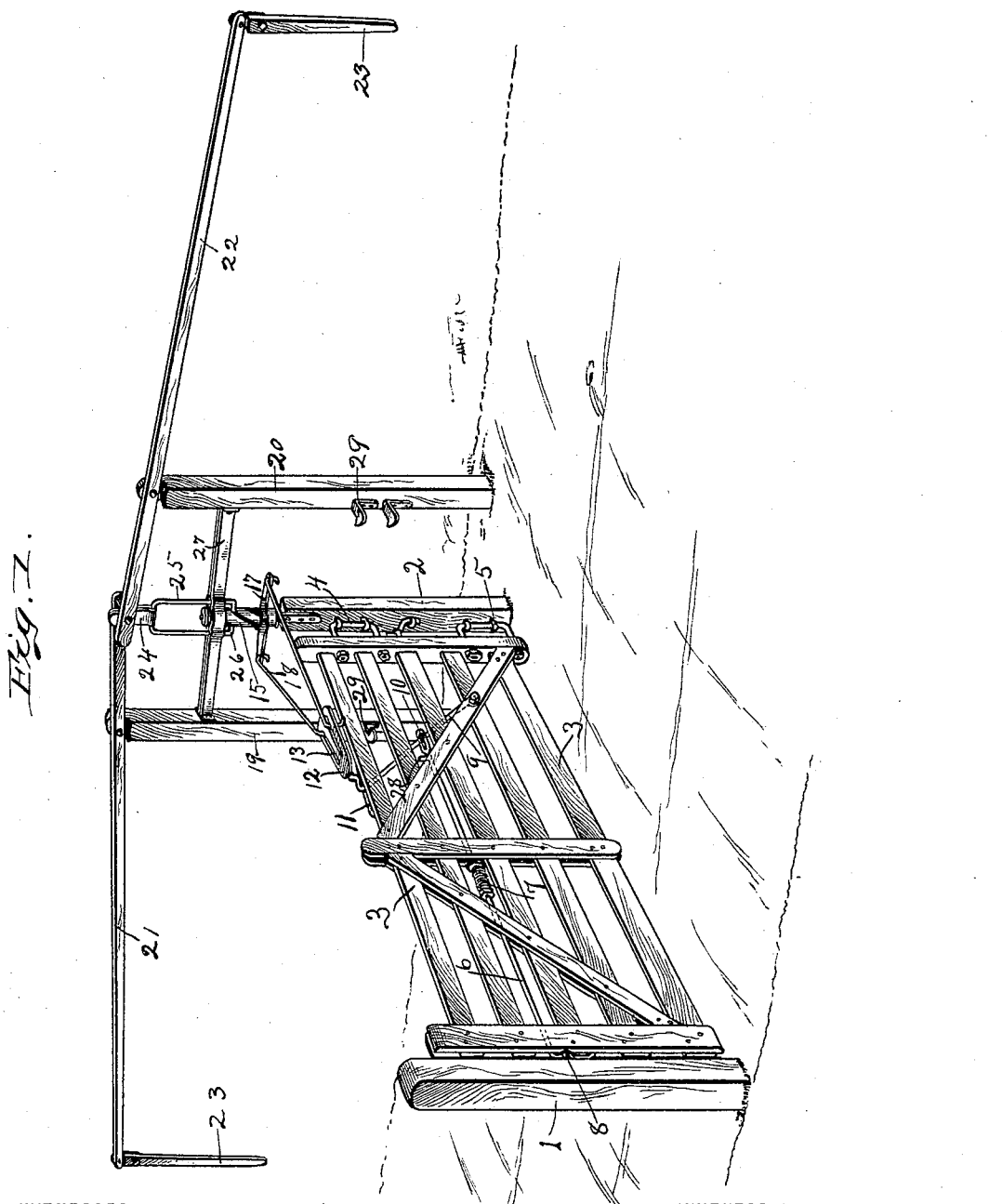
WITNESSES:
Horace B Jones
Zula Green
INVENTOR
Charles E. McDaniel
BY
V H Lockwood
His ATTORNEY.

(No Model.) 2 Sheets—Sheet 2.
C. E. McDANIEL.
FARM GATE.
No. 579,931. Patented Mar. 30, 1897.
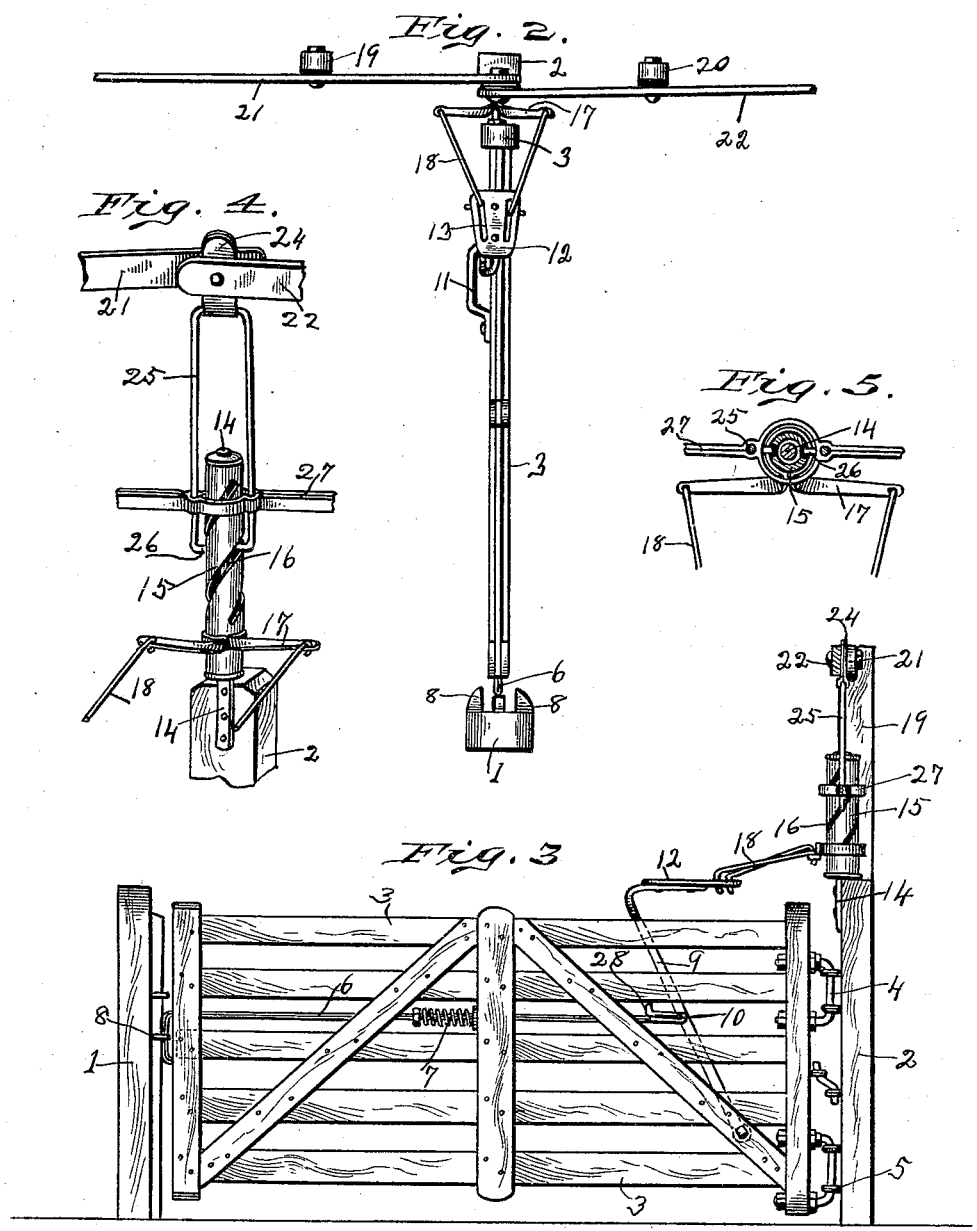
WITNESSES:
Horace B. Jones
Zula Green
INVENTOR
Charles E. McDaniel
BY
V. H. Lockwood
His ATTORNEY.

UNITED STATES PATENT OFFICE.

CHARLES E. McDANIEL, OF FRANKFORT, INDIANA, ASSIGNOR OF ONE-HALF TO NATHAN FLETCHER, OF SAME PLACE.

FARM-GATE.

SPECIFICATION forming part of Letters Patent No. 579,931, dated March 30, 1897.

Application filed November 23, 1896. Serial No. 613,061. (No model.)

*To all whom it may concern:*

Be it known that I, CHARLES E. MCDANIEL, of Frankfort, county of Clinton, and State of Indiana, have invented a certain new and useful Farm-Gate; and I do hereby declare that the following is a full, clear, and exact description thereof, reference being had to the accompanying drawings, in which like numerals refer to like parts.

My invention relates to a farm-gate that can be opened and closed without alighting from the vehicle. The full nature of it will be understood from the accompanying drawings and the description following.

In the drawings, Figure 1 is a perspective of the gate closed. Fig. 2 is a plan view, and Fig. 3 a side elevation, of the same. Fig. 4 is an enlarged detail view of the means for giving the lateral pulls to the gate. Fig. 5 is a cross-section of the same on the line A A, Fig. 4.

In detail, 1 and 2 are the end posts, and to the latter the gate 3 is hinged by any suitable form of hinge. I have here shown a U-shaped bar 4, secured to the gate and carried in a pair of eyes 5, screwed into the post 2. The hinges should be such as to hold the gate in a true horizontal position, whether it be opened or closed.

I provide a latch by means of a horizontal rod 6, running partially through the gate in a suitable guideway. It is pressed forward by the spiral spring 7, so that it engages the bevel-faced lugs 8 on the post 1. The latch is released by the same mechanism that opens the gate. For this purpose the rod 9 is pivoted at its lower end and extended through the long slot 10 in the rear end of the latch-rod 6 and also the guideway made on the upper part of the gate by the rod 11. The upper end of the unlatching-rod 9 is bent backward and has secured to it the plate 12, provided with two slots 13, that extend nearly parallel with the gate.

The following means are provided to actuate the unlatching mechanism just described and open or close the gate: On the top of the rear post 2 I secure the vertical rod 14, which carries a tube 15, provided with spiral slots 16 between its ends. On the lower end of the tube 15 I secure the pair of long oppositely-extending arms 17. These extend at right angles to the gate and in their outer ends carry the hooked links 18. One end of each of these links is bent downward and enters a slot 13, as shown. The hooks operate loosely in such slots. It is observed that the links are much farther apart at their attachment to the arms 16 than at their other end. By reason of this when the arms 17 are rotated by this spirally-slotted tube 15 one hook or link has a diagonal pull on the gate and will swing it to the side that the pull of the link is on. During such operation the hooked end of the other link is playing loose in its slot. At the first movement of the arms 17 the idle link will push forward somewhat. This is necessary, as the gate-plate 12 must be pulled backward somewhat by the link to unlatch the gate before the link can proceed to pull the gate open. A reversal of the rotation of the arms 17 will reverse the movement of the gate.

To rotate the tube 15, I provide the following means: On opposite sides of the rear post 2 I place the higher posts 19 and 20, and at their upper ends I pivot the levers 21 and 22 at a point between their ends. The outer ends of the levers 21 are provided with suitable hangers 25, that come within the reach of a person. The inner ends of the lever 22 are pivoted to a strap 24, that carries loosely a pair of rods 25, which at their lower ends have inwardly-turned fingers 26, which fit in the spiral grooves 16 in the tube 15. These rods 25 reciprocate through holes in the brace-rod 27, so that they will be held firmly in place and operate positively. The brace-rod 27 also holds the tube 15 in a fixed position.

The operation is as follows: When approaching the gate at the right, as shown, pull down on the hanger, whereupon the rods 25 will be elevated and the fingers 26, by engaging the walls of the spiral slots in the tube 15, will cause it, and therefore the arms 17, to rotate and pull the link 18 on the other side of the gate. When such link is pulled, it will gradually withdraw the plate 12 and the upper end of the rod 9. This latter will withdraw the latch-rod 6, thereby releasing the gate. Further pull will cause the link on the other side of the gate to pull it open in that direction until the lug 28 on the latch-rod will engage the catch 29, whereby the gate is held open. When one has thus opened the gate and passed through, he elevates the hanger and lever at the left side, which causes a reversal in the rotation of the tube 15 and arms 17. Then the link 18 on the right side is pulled. It first unlatches the gate and then returns it to the position shown. However, if the actuation of the lever 21 be continued longer it will cause the gate to swing shut and then open on the other side. When one approaches the gate from the left side, the process described is reversed.

The advantages of the construction lie in the positiveness of the operations of the gate. The gate is completely under the control of the operator and must act as he wants it to act. There is no chance for it to hesitate or fail in its action. Furthermore, it requires but little strength to operate it, and in this connection I may say that since the lever 21 is always to be pushed up it would make the operation easier to place the post 19 somewhat farther from the gate than the post 20, for the lever 22 always must be pulled down to throw the gate away from the operator.

What I claim as my invention, and desire to secure by Letters Patent, is—

1. In a farm-gate a spirally-grooved vertical tube or rod rotatably mounted, arms secured to such tube extending at right angles to the gate, links extending from the ends of the arms diagonally to the gate, a vertically-movable piece with a finger extending into the spiral groove, and levers extending out from the gate to operate the fingered piece.

2. In a farm-gate, a spirally-grooved vertical tube or rod rotatably mounted, arms secured to such tube extending at right angles to the gate in opposite directions, links extending from the ends of the arms diagonally to the gate, a post placed on each side of the rear gate-post, levers pivoted thereon and extending away from the gate, and a vertically-movable piece connected with the levers and provided with fingers extending into the spiral grooves.

3. In a farm-gate, a rod extending vertically from the top of the rear gate-post, a spirally-grooved tube rotatably mounted on such rod, a pair of arms secured to such tube, links extending diagonally from the ends of such arms to the gate, a post on each side of the rear gate-post, levers pivotally mounted thereon extending away from the gate, a brace-bar between such posts that braces the upper end of the slotted tube and has in it a pair of guide-holes, and two arms that vertically reciprocate in the guide-holes of the brace-bar having at their lower ends fingers extending into the spiral grooves and at their upper end connected with such levers, substantially as set forth.

4. In a farm-gate, a spring-actuated latching device, a plate connected therewith provided with a pair of slots substantially parallel with the gate, a pair of oppositely-extended arms mounted in the rear of the gate at right angles thereto, means for rotating such arms, and links connected to the outer ends of such arms and having at their inner ends hooks that work loosely in said slots to withdraw said plate.

5. In a farm-gate, a horizontal latch-rod having a slot in its rear end, a spring to push the same forward, a rod pivoted at its lower end and extending upward through the slot in the latch-rod, a plate connected to the upper end of such rod provided with a pair of slots substantially parallel with the gate, a pair of arms oppositely extended mounted behind the gate at right angles thereto, means for rotating such arms, and links connected to the outer ends of such arms and having at their inner ends hooks that work loosely in the slots in said plate.

6. In a farm-gate, a horizontal latch-rod having a slot in its rear end, a spring to push the same forward, a rod pivoted at its lower end and extending upward through the slot in the latch-rod, a plate connected to the upper end of such rod provided with a pair of slots substantially parallel with the gate, a pair of oppositely-extending arms mounted in the rear of the gate at right angles thereto, means for rotating such arms, links connected to the outer ends of such arms and having at their inner ends hooks that work loosely in the slot in the said plate, a post beside the rear gate-post, and suitable catches on the front gate-post and side post to be engaged by the latch-rod, substantially as set forth.

In witness whereof I have hereunto set my hand this 9th day of November, 1896.

CHARLES E. McDANIEL.

Witnesses:
O. J. BOULDEN,
A. H. BOULDEN.